Feb. 9, 1932.  A. CESARIO  1,844,636
WATER WAVE POWER DEVICE
Filed June 5, 1929
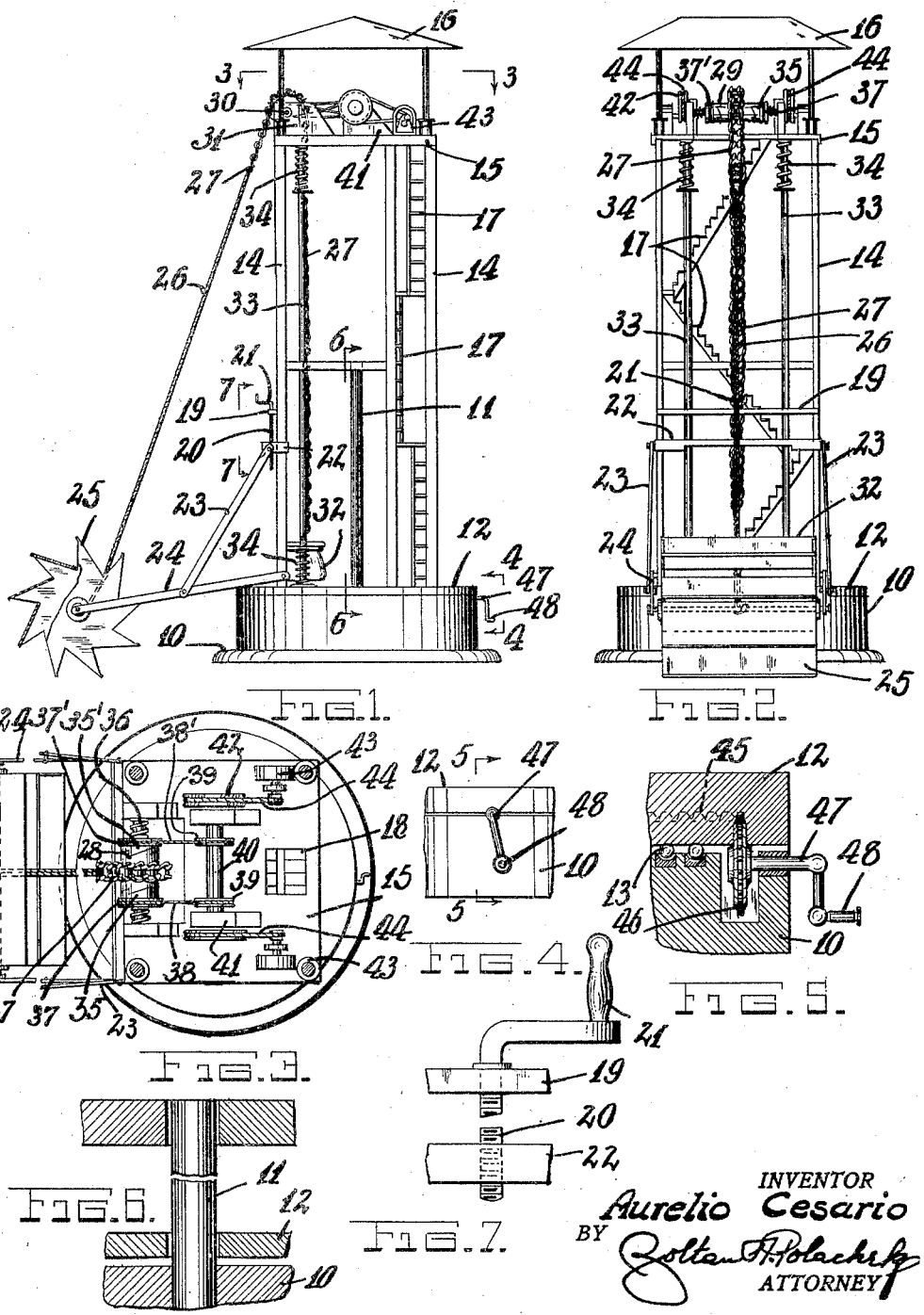

Patented Feb. 9, 1932

1,844,636

UNITED STATES PATENT OFFICE

AURELIO CESARIO, OF NEW YORK, N. Y.

WATER WAVE POWER DEVICE

Application filed June 5, 1929. Serial No. 368,485.

This invention relates to new and useful improvements in waterpower machines.

The invention has for an object the provision of a device of the class mentioned which is of simple durable construction, dependable in use and efficient in action, and which may be manufactured and sold at a reasonable cost.

The invention proposes the use of a waterwheel rotatively supported on a rotatively adjustable tower and arranged for vertical adjustments and connected with a weight for raising the same from power inherent in moving water and simultaneously transmit power of the water waves to a generator or the like, and an arrangement being provided for converting the potential power of the raised weight to drive the said generators or the like continuously.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a side elevational view of a device constructed according to this invention.

Fig. 2 is a front elevational view of Fig. 1.

Fig. 3 is a fragmentary horizontal sectional view taken on the line 3—3 of Fig. 1.

Fig. 4 is a fragmentary elevational view looking in the direction of the arrows 4—4 of Fig. 1.

Fig. 5 is a sectional view taken on the line 5—5 of Fig. 4.

Fig. 6 is a fragmentary sectional view taken on the line 6—6 of Fig. 5.

Fig. 7 is a fragmentary elevational view looking in the direction of the arrows 7—7 of Fig. 1.

The reference numeral 10 indicates generally a base provided with a central vertical pole 11. A horizontal disc 12 is rotatively mounted upon the pole and upon the base, ball bearings 13 being depended to provide the rotation connection between the disc and the base. A tower 14 is mounted upon the disc 12 and has a top floor 15. A roof structure 16 is built upon the top floor and covers various apparatus mounted upon the floor 15 and hereinafter described in detail. Stairs 17 lead from the disc 12 to the top floor 15, an opening 18 being formed in the floor 15 permitting the passing of people.

A stationary bar 19 projects from the front of the tower 14 and a screw 20 is rotatively engaged in the bar. A handle 21 connects with this screw for turning purposes. A second cross bar 22 is vertically slidably mounted upon the tower 14 and is threadedly engaged by the screw 20 so as to be capable of assuming various fixed positions. Inclined braces 23 pivotally connect with the ends of the bar 22 and at their other ends pivotally connect intermediate the ends of arms 24. At their inner ends these arms are pivotally connected with the tower 14, and a waterwheel 25 is rotatively mounted upon the free ends of the arms.

A flexible cable 26 is attached upon the waterwheel 25 and extends upwards and connects with a chain 27. This chain is extended over sprocket teeth 28 upon a central ratchet member 29. This ratchet member is rotatively mounted upon a shaft 30 supported in standards 31 fixed upon the floor 15. The other end of the chain 27 connects with a weight 32 slidably mounted on vertical guide rods 33 extending substantially the full height of the tower 14. These guide rods are provided at their tops and bottoms with shock absorbers 34.

End ratchet members 35 and 35' are rotatably mounted upon the shaft 30 and are normally urged into engagement with the central ratchet member 29 by springs 36. These springs are coaxially mounted upon the shaft 30 and act against the standards 31. Pulleys 37 and 37' are fixed upon the end ratchet members 35 and 35', respectively and cross belt 38 and parallel belt 38' extend over these pulleys respectively and over pulleys 39 fixed upon a shaft 40 rotatively mounted in standards 41 fixed upon the floor 15. Other pulleys 42 are also fixed upon the shaft 40 and are connected for driving generators 43 by belts 44. While generators have been illustrated, other machinery may be substituted in place, such as pumps, compressors or the like. These generators are shown mounted upon the floor 15.

The disc 12 is formed with gear teeth 45 and a gear 46 engages these teeth and is fixed upon a shaft 47 rotatively mounted on the base 10. A handle 48 is provided for turning the shaft 47.

In operation of the device handle 21 is manipulated for raising or lowering the cross bar 22 for adjusting the vertical position of the waterwheel 25. This permits the waterwheel to be lowered into water to any desirable height or to be completely raised out from the same. Handle 48 may be rotated for turning the disc 12 with all the parts positioned thereon so that the waterwheel 25 may be directed for advantageously picking up power from moving water. The motion of the water is depended upon for rotating the waterwheel which causes the cable 26 to be wound upon itself.

As the cable 26 is wound upon the waterwheel, the weight 32 will be raised and, the ratchet members 29, 35 engage each other for transmitting power to the generators 43 and upon the downward motion of the weight 32, ratchet members 29 and 35' engage each other and ratchet wheels 29 and 35 disengage each other thereby transmitting a continuous motion and steady power to the generator. Preferably the device should be so adjusted that the weight 32 moves up and down upon the guide rods 33 without reaching the tops or bottoms. In the event that the weight reaches the top, the handle 21 may be manually manipulated by a watchman for raising the waterwheel higher from the water so that the water wave will not reach above the center of the waterwheel 25.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a device of the class described, a tower, arms pivotally mounted at their ends upon said tower, a water wheel rotatively supported on the ends of said arms, and means for rigidly holding said water wheel at fixed adjusted positions in the water, comprising a bar attached upon the tower, a cross bar slidably mounted on said tower, a screw positioned parallel with the line of sliding of said cross bar and rotatively supported on the first mentioned bar and threadedly engaging through said cross bar, and braces pivotally connected at one of their ends respectively intermediate of the ends of said arms and at their other ends pivotally connected on said cross bar.

2. In a device of the class described, a tower, arms pivotally mounted at their ends upon said tower, a water wheel rotatively supported on the ends of said arms, and means for holding said water wheel at fixed adjusted positions in the water, comprising a bar attached upon the tower, a cross bar slidably mounted on said tower, coacting means on said fixed bar and cross bar for holding the cross bar at various distances from the fixed bar and braces pivotally connected at one of their ends respectively intermediate the ends of said arms and at their other ends pivotally connected on said cross bar.

In testimony whereof I have affixed my signature.

AURELIO CESARIO.